March 31, 1925.　　　　　　　　　　　　　　　　　　1,531,983
B. E. SAWYER
METHOD OF ATTACHING PLASTIC MATERIAL TO WOOD OR THE LIKE AND PRODUCT THEREOF
Filed Jan. 29, 1924

INVENTOR
B. E. Sawyer
By Attorneys
Southgate & Southgate.

Patented Mar. 31, 1925.

1,531,983

UNITED STATES PATENT OFFICE.

BURNSIDE E. SAWYER, OF FITCHBURG, MASSACHUSETTS.

METHOD OF ATTACHING PLASTIC MATERIAL TO WOOD OR THE LIKE AND PRODUCT THEREOF.

Application filed January 29, 1924. Serial No. 689,356.

*To all whom it may concern:*

Be it known that I, BURNSIDE E. SAWYER, a citizen of the United States, residing at Fitchburg, in the county of Worcester and State of Massachusetts, have invented a new and useful Method of Attaching Plastic Material to Wood or the like and Product Thereof, of which the following is a specification.

This invention relates to the attachment of plastic material in sheet form to a base of wood or other solid material. The principal objects of the invention are to provide an improved method of securing the sheet material to the solid base; to provide for preparing the base for receiving the sheet material on its surface so that it will hold permanently; and to provide an improved product consisting of a block of wood or the like with a sheet of the finishing material on one or more surfaces.

Reference is to be had to the accompanying drawings, in which—

The invention is applicable to the formation of dominoes or other game pieces which ordinarily are made of solid wood, celluloid, hard rubber and the like, but it is not limited thereto. I have shown it as applied to the manufacture of such a piece for the purposes of illustration.

Figure 1:
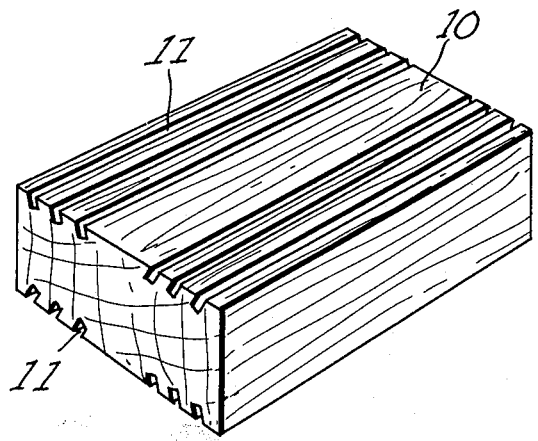
Fig. 1 is a plan of a wooden block adapted to constitute the base of the article to be formed.
Figure 2:
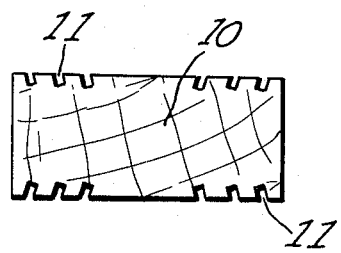
Fig. 2 is an end view of the same.

In Figs. 1 and 2, I have shown a block 10 of wood although it can be made of other materials. This block constitutes the base of the article to be produced and I have shown it as provided with two parallel series of grooves or depressions 11 on two surfaces thereof but the invention is applicable to any desired number of surfaces. In the form shown, these grooves are in two series. The grooves of each series are slanted inwardly slightly toward the other to form undercut recesses. These grooves, however, can be formed in other shapes as for example, dove-tail or square. I have shown the grooves on both sides in order to provide the product with an ornamental or attractive covering on both sides.

Figure 4:
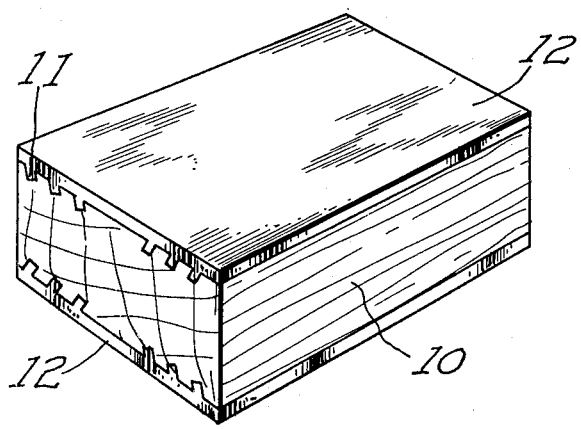
Fig. 4 is an edge view of the same.
Figure 3:
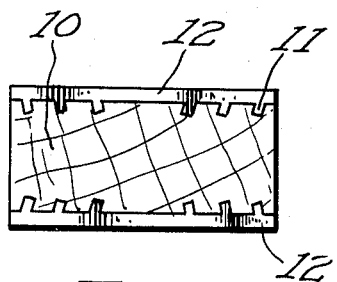
Fig. 3 is an end view of the resulting product.

For the purpose of placing a sheet 12 of pyroxylin or other plastic material on both side surfaces of the block 10, I take a sheet of it having any desired uniform thickness and heat it to a condition in which it will flow under pressure. Then I apply such a sheet to one or to two opposite surfaces of the wood and subject it to sufficient pressure. I use a hydraulic press in which the pressure can be made so great as to force the softened inner surface of the pyroxylin outwardly into the grooves 11. The pressure is kept on the article until the celluloid or pyroxylin material penetrates to the bottoms of these grooves and then the block can be kept under pressure until the pyroxylin cools sufficiently to retain its shape as thus produced. Then the pressure is removed and it will be found that the wooden base is permanently covered on two opposite sides in the form illustrated in Figs. 3 and 4. The projections thus formed on the sheets of pyroxylin are firmly and permanently united with the wood without the use of cement and in such a way that no ordinary use, wear, or deterioration can separate them therefrom. This forms a permanent block coated on two sides with the pyroxylin or other desired plastic material.

As so applied, this coating would be smooth and uniform on its exposed surfaces. Either during the above mentioned compressing and uniting operation, or in a separate operation, the outer surfaces of the celluloid or pyroxylin may be embossed or impressed with any desired kind of figures or ornamentation and of course afterwards it can be colored as may be desired.

This provides a permanent article with attractive opposite surfaces which can be used for dominoes, or other game pieces of any desired character according to the designs that are placed on the exposed surface or surfaces. The same principle can be employed for the manufacture of other articles, whether they have plain, convex or irregular surfaces. By slanting the grooves toward each other, I get the effect of dovetail connections without necessitating the ordinary undercutting process on the wood.

Although I have illustrated and described only a single embodiment of the invention, I am aware of the fact that modifications can be made therein by any person skilled in the art without departing from the scope of the invention as expressed in the claims.

Therefore I do not wish to be limited to the exact article shown, but what I do claim is:—

1. The method of uniting pyroxylin material to wood, which consists in providing the wood with two parallel series of grooves inclined from the surface in opposite directions, and compressing a heated layer of pyroxylin on that surface of the wood until it flows into the grooves of the wood and forms permanent projections extending into said surface to hold the pyroxylin in place.

2. As an article of manufacture, a game piece comprising a base of wood having grooves in its two opposite surfaces extending inwardly and slanting in opposite directions from the surface, and a layer of pyroxylin material on each of said surfaces having projections extending into said grooves to hold it permanently in position thereon.

In testimony whereof I have hereunto affixed my signature.

BURNSIDE E. SAWYER.